United States Patent [19]

Lilly

[11] Patent Number: 4,651,465
[45] Date of Patent: Mar. 24, 1987

[54] METHOD AND DEVICE FOR PROTECTING PLANTS FROM FREEZE DAMAGE

[75] Inventor: John Lilly, Cincinnati, Ohio

[73] Assignee: Frostproof Growers Supply, Inc., Frostproof, Fla.

[21] Appl. No.: 691,273

[22] Filed: Jan. 14, 1985

[51] Int. Cl.$^4$ ............................................. A01G 13/00
[52] U.S. Cl. .......................................................... 47/2
[58] Field of Search ................. 47/2, 20, 21, 22, 23, 47/24, 25, 26, 27, 28, 29, 29.1, 30, 31, 32

[56] References Cited

U.S. PATENT DOCUMENTS

| | | | |
|---|---|---|---|
| 464,879 | 12/1891 | Knapp | 47/23 |
| 1,442,367 | 1/1923 | Stevens | 47/2 |
| 1,846,395 | 2/1932 | Huffaker | 47/2 |
| 2,006,562 | 7/1935 | Scheu | 47/22 |
| 3,218,759 | 11/1965 | Barrons | 47/30 |
| 3,226,881 | 1/1966 | Garrett | 47/30 |
| 3,270,461 | 9/1966 | Fowler | 47/2 |
| 3,890,740 | 6/1975 | Miller | 47/2 |
| 4,495,723 | 1/1985 | Wasserman | 47/2 |

*Primary Examiner*—Robert A. Hafer
*Assistant Examiner*—Bradley M. Lewis
*Attorney, Agent, or Firm*—Frost & Jacobs

[57] ABSTRACT

A device and method for protecting plants, especially citrus trees, from damage resulting from freezing temperatures. A heat conducting device, which derives its heat from circulating water, is placed adjacent a tree trunk. The heat conducting device and the tree trunk are placed within a thermal barrier and the top of the thermal barrier is sealed around the tree trunk to define an air space thereabout. Water is circulated through the heat conducting device and heat is supplied to the air space. Water leaving the heat conducting device may be poured onto the ground or sprayed over the tree to provide additional protection to the plants during a freeze.

15 Claims, 6 Drawing Figures

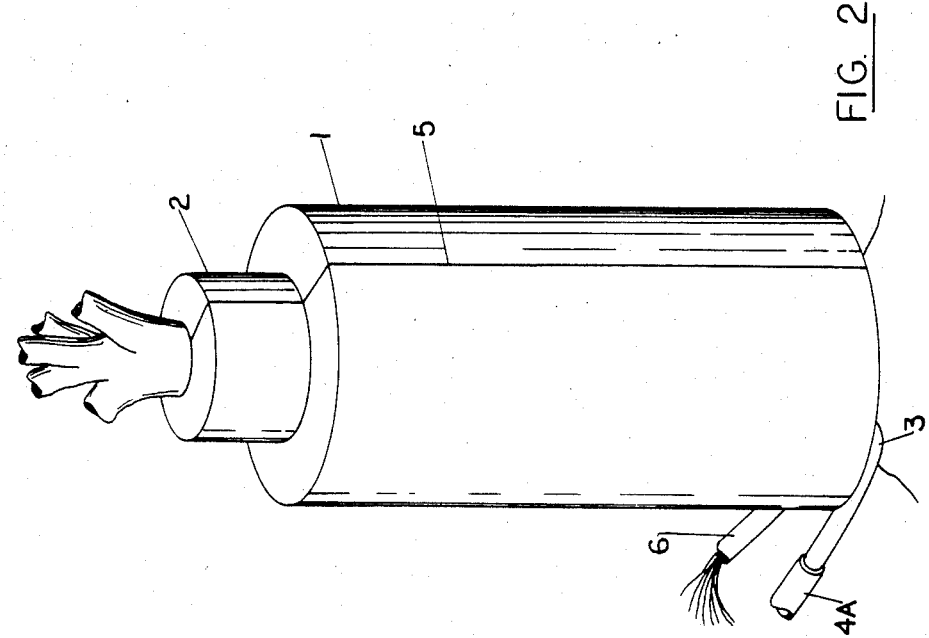
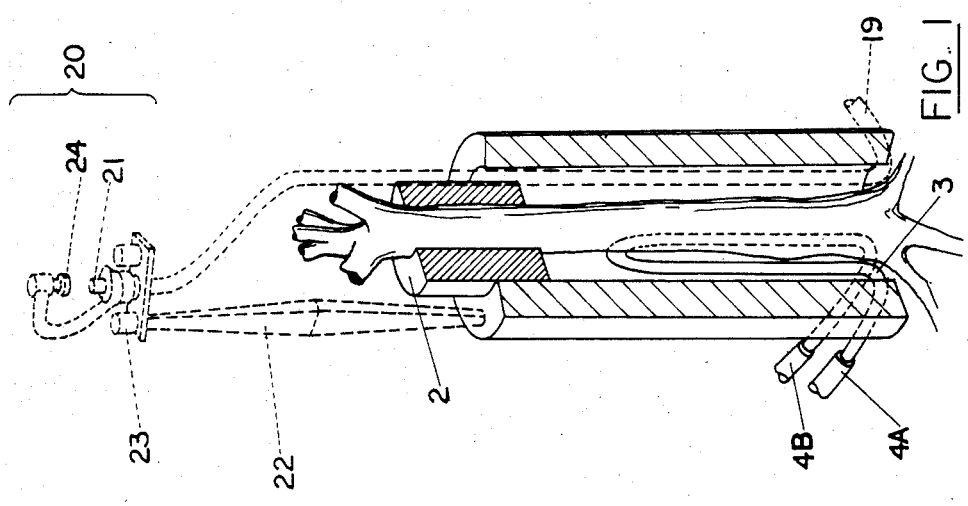

METHOD AND DEVICE FOR PROTECTING PLANTS FROM FREEZE DAMAGE

BACKGROUND OF THE INVENTION

1. Field of the Invention

The present invention relates to devices and a method for protecting living plants from freeze damage. More particularly, the invention involves plant covers or tree trunk guards for frost prevention in the class of plant husbandry.

2. Background of the Invention

Citrus trees and other fruit trees and wooded plants are susceptible to cold weather when young. Young citrus trees are particularly vulnerable at the trunk location called the bud union where the trunk of the tree has been grafted to the root stock. If the bud union becomes frozen, the tree is lost. Several common practices have developed over the years to protect these young plants from deadly freeze. One common method involves piling dirt around the trunk. This method has many disadvantages. The banks of dirt must be built and torn down each year and the accumulated dirt has deleterious effects on the plant. These effects include promotion of fungus disease and deterioration resulting from the hot moist soil steaming the tree bark.

Other methods of tree freeze protection include insulating wraps made of materials such as rock wool, fiberglass and polyurethane foam. Among other disadvantages with these items, the rock wool has been found to harbor rodents and the fiberglass has been found to sag excessively under heavy rain. Only the polyurethane foam has found any commercial success but, if untreated, it deteriorates from exposure to sunlight. It also has the disadvantage that it requires two people for installation. One person will wrap a sheet around the tree and hold it while another person will tie it on or strap it in place. The ties or straps are undone in the springtime after the threat of a freeze has passed.

More sophisticated methods of freeze protection are taught in the U.S. Pat. Nos. 4,137,667, ('667), 3,466,799 ('799), 4,341,039 ('039) and 4,400,909 ('909). Patent '667 discloses a variety of double walled plastic containers which are placed around or over young plants. The containers provide some thermal insulation to the plant by creating a dead air space. Also, they are designed to have the space between their double walls filled with water to provide a low rate heat source at 32° Fahrenheit through the latent heat of fusion. As the water freezes it releases heat to its surrounding environment for an extended period of time and maintains the temperature of the air surrounding the plant at or near 32° Fahrenheit.

The teachings of patent '667 are useful for small seasonal plants started in the late winter but are impractical for use with citrus trees and the like. The usefulness of the '667 patent derives from its ability to completely enclose the plants in a shroud of plastic and water. That is, the '667 patent contemplates a frost protection method which requires total enclosure of the plant.

U.S. patent '799 discloses another device for plant protection. This device too is designed to totally enclose the plant from the stem base at ground level to the top of the foliage and is constructed of a thermal insulating material. Since the invention provides no heat source inside the thermal barrier, the device relies solely upon retention of trapped heat for protection of the plant.

As with the '667 patent, the device of the '799 patent would be impractical for use with citrus trees and the like. It would be difficult to design a total enclosure suitable to the wide variety of shapes and sizes of such plants. Furthermore, the device disclosed in patent '799 shares two other faults with the '667 patent device when applied to citrus trees. First, because it lacks an independent heat source, it is not useful when the ambient temperature falls much below 32° Fahrenheit or when the ambient temperature is below freezing for a long period of time. Second, both devices envision total enclosure or coverage which is impractical with citrus trees due to the costliness of such methods. Furthermore, it has been found sufficient to protect only the lower portion of a young tree from freezing since the upper branches and leaves will rejuvenate if the trunk and, in the case of citrus trees, the bud union survives.

U.S. patents '039 and '909 teach an improvement upon the preceding solutions in the case of citrus trees and the like. These patents disclose, respectively, an insulating device designed to be secured to the tree trunk and an improvement upon such device providing insecticide. The device consists of two mirror image pieces which, when held together by a large clip, provide a complete thermal enclosure surrounding the tree trunk extending from the ground upward an indefinite distance. In its preferred embodiment, the two pieces have an interior recess in which a pesticide container and a liquid container are held by a splint. Pesticide vapors emanate from the pesticide container and the liquid container is filled either with water or some other liquid useful to provide heat through the latent heat of fusion which is released when the liquid undergoes transformation from the liquid to the solid state.

The devices taught by patents '039 and '909 have several limitations. As with all other methods described above, the heat source provided internal to the insulating barrier is not controllable or sustained. Even when treated to prevent supercooling before freezing, the water packets of the '039 and '909 patents have a limited quantity of energy available for release through the heat of fusion. Furthermore, these devices are not well sealed at the top of the insulating barrier and allow the heat to escape easily. A prolonged cold wave or a cold wave falling several degrees below 32° Fahrenheit would result in tree trunk temperatures and, in the case of citrus trees, bud union temperatures falling below the deadly level of approximately 26° to 28° Fahrenheit.

The devices of the '039 and '909 patents have additional problems. Because they comprise two pieces held together by a clip, they easily can be knocked off by a passing animal or a strong breeze. If the two halves are knocked out of close contact and alignment, much of the insulating value is lost and the device becomes virtually useless to prevent freezing. Also, because the design involves packets held within the insulating shell, it is not well suited to on-sight construction and assembly. The result is that this device cannot readily be adapted to tree trunks of varying height. Unless the tree trunk is the exact height of the pre-assembled device of patents '039 and '909, or a multiple of that height, some otherwise protectable portion of the tree trunk goes unprotected. The additional tree loss due to freezing increases the time necessary for the tree to rejuvenate and, in some cases, may result in resprouting at awkward locations on the trunk.

SUMMARY OF THE INVENTION

The present invention overcomes the many faults of the devices and methods previously used to protect citrus trees and the like from freezing temperatures. The present invention provides a thermal barrier around the tree trunk which easily can be installed by one person and can be tailored to the tree trunk height. Within this thermal barrier the present invention provides in the preferred embodiment a means for controllable, sustained heat infusion which takes advantage of the irrigation systems often present in citrus groves.

One object of the present invention is to prevent plant freezing under conditions which are more severe than can be met by prior art techniques. This is accomplished by providing a sustained heat infusion means near the tree trunk. More specifically, the present invention provides for circulation of water near the tree trunk inside the thermal barrier. The water passes into this region from a tube or hose leading either from tree to tree or directly from the water source to the tree. In other words, the trees can be connected to the water source either in series or in parallel or in any combination of the two.

The resulting network of hose and tree shields can be either close-loop or open-loop. If open-loop, the present invention provides another freeze protection advantage over prior art methods. Studies by Robert Leyden and R. H. Hensz of Texas A&I University reported in a publication entitled "Effects of Conventional Cold Protection Systems in a Radiational Freeze" indicate that irrigation of the ground results in a warmer orchard during a freeze because the water in the ground increases the heat capacity of the ground. One object of the present invention is to provide the ability both to protect the tree trunk through a thermal barrier with sustained infused heat and to protect the remaining exposed portion of the trees through irrigation of the adjacent ground and the tree before and during the period of freezing temperatures.

In addition to the advantages of sustained heat infusion and of plant and ground heating by irrigation described above, the thermal barrier provided in the present invention has certain structural advantages over the prior art. The present invention provides a one piece thermal barrier consisting of resilient insulating material, such as treated polyurethane, or polyethelene molded or extruded into a tube of sufficient inner diameter to accommodate both a typical tree trunk and a heat infusion means. The thermal barrier piece is provided with a longitudinal cut through the barrier wall. To install the structure of the present invention, one person simply places the heat infusion means adjacent the tree trunk; chooses an appropriate length of insulating barrier; prys it around the tree trunk and the heat infusion means; and plugs the gap between the top of the insulating barrier and the tree trunk. The resiliency of the insulating barrier material causes it naturally to return to a closed condition surrounding the trunk and heat infusion means.

The structure of the present invention provides several advantages over the prior art. Because both the thermal barrier and plug are constructed of single resilient pieces of insulating material, they can be attached easily by one person without the attendant risk that winds or similar forces might create a breach in the barrier as is possible with the device of the '039 and '909 patents. Also, because the present invention is well suited to on-sight assembly, the length of the insulating barrier can be selected on-sight to fit the desired amount of trunk height to be protected. This allows for maximum tree protection.

BRIEF DESCRIPTION OF THE DRAWINGS

FIG. 1 is a cross-sectional view illustrating two embodiments of the present invention.

FIG. 2 is a perspective view of the preferred embodiment.

DESCRIPTION OF THE PREFERRED EMBODIMENT

One variation of the preferred embodiment is shown in FIG. 1 where the heat infusion means is a circulating tube 3 shown in solid lines where appropriate. The assembly illustrated there consists of a tubular thermal barrier 1 placed around the tree trunk enclosing both the trunk and the heat infusion means. In that illustration, the thermal barrier 1 is constructed of resilient insulating material such as polyurethane, polyethelene, polystyrene or natural rubber. The thermal barrier 1 is molded or extruded into a tube of sufficient interior diameter to accommodate both a typical tree and a heat infusion means. While the thermal barrier 1 is shown here as a circular cross section, any appropriate cross section shape could be used. The thermal barrier is provided with a longitudinal cut 5. The heat infusion means of this embodiment is a circulating tube 3 placed inside the barrier 1 and adjacent the tree trunk. Water enters and exits the circulating tube 3 through hoses 4A and 4B, respectively. The circulating tube may be constructed of any heat conducting material.

The integrity of the thermal enclosure is made complete by plug 2. Plug 2 is a split cylindrical device having an exterior diameter somewhat larger than the interior diameter of the thermal barrier 1 and an interior diameter somewhat smaller than the exterior diameter of the tree. The plug 2 is molded or extruded from any soft insulating material and may be made of the same material as the thermal barrier 1. The plug 2 is packed around the top of the trunk to fill the space between the trunk and the inner surface of the thermal barrier 1. With these pieces in place, the heat from the water radiates from the circulating tube 3 and is held in the space surrounding the trunk.

Figure 5:
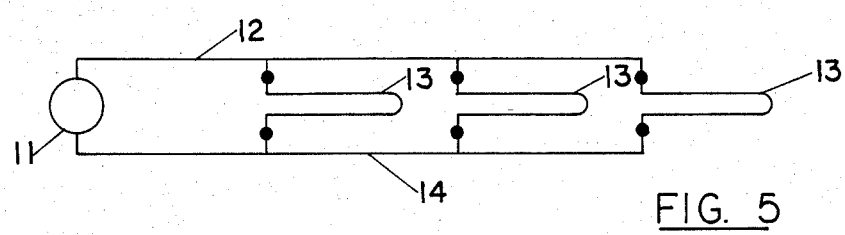
FIG. 5 is a schematic representation of a system in which three devices of the present invention are connected in parallel.
Figure 6:
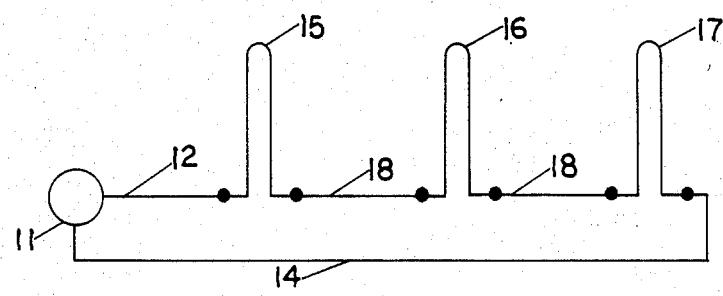
FIG. 6 is a schematic representation of a system in which three devices of the present invention are connected in series.

The present invention provides the option to connect the inlet end of the heat infusion means to a water source and the outlet end to a return. When two or more trees are protected, the devices of the present invention may be connected in series, parallel or any combination of the two. FIG. 5 illustrates a parallel connection of the present invention. A water source 11 feeds a supply line 12 which is connected to the inlet ends of three heat infusion means 13. The outlet ends of the heat infusion means are connected to a return line 14. FIG. 6 illustrates a series connection of the present invention. A water source 11 feeds a supply line 12 which is connected to the inlet end of the first infusion means 15. Intermediate lines 18 connect the outlet and inlet ends of the heat infusion means 15, 16 and 17. A water source 11 feeds a supply line 12 which is connected to the inlet end of the first infusion means 15. Intermediate lines 18 connect the outlet and inlet ends of the heat infusion means 15, 16 and 17. The outlet end of heat infusion means 17, the last in the series, is connected to a return line 14.

As stated above, the present invention differs from prior art devices and methods by its use of a heat source within the thermal barrier which is supplied and controlled externally of the barrier. Another difference provided by the present invention is the option to supplement the protection of the trunk with protection of the remainder of the plant through irrigation of the ground or of the tree and the ground. One use of the present device in that way is illustrated in FIG. 2. The irrigation method can be carried out quite simply by disconnecting exit hose 4B from the circulating tube 3 provided the heat infusion means are not in an exclusively series connection. Irrigation also may be accomplished by using a perforated hose as the connector between the several heat infusion means.

Another embodiment of the present invention which provides additional irrigation benefits is shown in FIG. 1 with the heat infusion means in dashed lines. The thermal barrier 1 and plug 2 are used in this embodiment in the same manner as in those embodiments previously described. However, the heat infusion in this embodiment is accomplished by a single length of an irrigation supply hose 19 which is connected to the irrigation assembly shown generally at 20. Irrigation assembly 20 is conventional and comprises a sprinkler head 21, a ground stake 22, and a union 23. The irrigation supply hose 19 can be positioned within the thermal barrier 1 to provide heat infusion or, if internal heat infusion is considered unnecessary, hose 19 can be placed outside of thermal barrier 1 without detracting from the other advantages of this embodiment.

Irrigation assemblies of this sort are used in the general irrigation of citrus groves by inserting the lower end of the ground stake 22 into the ground and connecting the free end of hose 19 to a water supply. When the water supply is activated, a cone of water will spray downward from the dispersion means 24.

In the present embodiment of the invention the irrigation assembly 20 is used in a similar manner except that ground stake 22 is securely connected to the top surface of the thermal barrier 1 so that the dispersion means 24 is elevated farther above the ground level than it would be in normal application. The present embodiment, shown in dashed lines in FIG. 1 provides benefits in addition to those already mentioned above in connection with other embodiments. In a typical citrus grove, irrigation devices such as the irrigation assembly 20 often are installed in the ground at the time young trees are planted. The irrigation devices are left unattended unless repairs are required and may remain in place for several years. The present embodiment improves the quality of such grove irrigation systems. In usual practice, irrigation assemblies of this sort typically are placed at least 12 inches from the trunk of a tree in order to avoid risk of injury to the roots. This distance reduces the effectiveness of the irrigation of the adjacent tree since the irrigation pattern is not centered around the tree. The mounting of the ground stake 22 in the top surface of the thermal barrier 1 as provided in this embodiment reduces the risk of injury to the root growth of a young citrus tree and provides a better irrigation pattern.

Positioning of the irrigation assembly in the manner of the present embodiment also improves the freeze protection capabilities of the present invention. If water is supplied to the hose 19 during a freezing condition, heat conducted through the hose 19 will be retained within the thermal barrier 1 to protect the tree trunk in the same manner as with the previously described embodiment. Additionally, and independent of the heat conducted through the hose 19, when the ambient temperature is above freezing, the constant spray of water from the dispersion means 24 will warm the exposed tree surfaces beneath it due to the flow of water over the tree exterior and will warm the ground surrounding the tree. When the ambient temperature is below freezing, the constant spray of water from the dispersion means 24 will warm the tree and maintain all the exposed tree surfaces beneath the height of the dispersion means 24 in a constant process of new ice formation. Because ice formation is an exothermic process, the tree portions and ice layers beneath the newly forming ice layer will be maintained at approximately 32° Fahrenheit—above the deadly level of approximately 26°-28° Fahrenheit. Furthermore, the heat released by the water spray and ice formation around the tree will continually drift upward to warm the tree canopy. The present embodiment, therefore, provides numerous advantages over the prior art.

Figure 3:
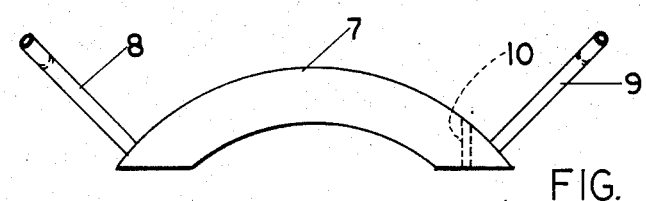
FIG. 3 is a top view of a modified heat infusion means.
Figure 4:
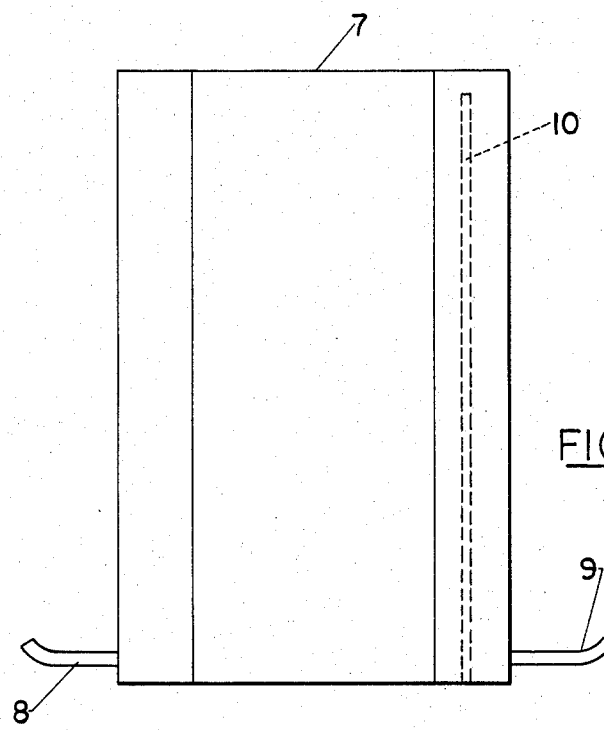
FIG. 4 is a front view of a modified heat infusion means.

Another embodiment of the present invention, shown in FIGS. 3 and 4, provides a heat convection chamber 7 to be used as an alternative to the circulating tube 3 or the hose 19. The chamber 7 is designed for placement inside the thermal barrier 1 and adjacent the tree trunk. It is provided with an inflow pipe 8 and an outflow pipe 9. It also may be fitted with one or more baffles 10 designed to insure proper mixing and flow of the water therein. The heat convection chamber 7 may be contoured to fit conveniently within the space between the tree trunk and the inner surface of the thermal barrier. The heat convection chamber 7 may be constructed of any heat conductive material.

An additional embodiment of the present invention, not illustrated in the drawings, provides for the thermal barrier to be used together with soil banking techniques to provide supplemental thermal protection. In such a soil banking embodiment, the thermal barrier 1 would be placed around the tree trunk and soil would be piled around the outside of the thermal barrier 1 nearly to the top. A small portion at the top of the thermal barrier 1 would remain uncovered by the soil. Such a configuration would greatly improve upon present soil banking methods since the strong thermal barrier 1 would maintain an air space around the tree trunk. With such an airspace, the bank would be prevented from steaming the tree bark or from promoting fungus disease. At the same time, the thermal barrier and the mound of soil would combine to provide a great degree of insulating effect, particularly at the bud union near the base of the tree trunk. This embodiment provides the option to leave the airspace around the tree trunk open or to close it with plug 2.

For convenience, the present invention has been described as used with trees, but one skilled in the art would easily recognize that the present invention is applicable to any plant having a trunk or stem which should be protected. Therefore, the term "tree" as used herein and in the claims should be interpreted sufficiently broadly to encompass any plant having a trunk or stem to be protected.

Modifications can be made in this invention without departing from the spirit of it. For example, it would be within the scope of the present invention to use a loop of irrigation sprinkler hose as the heat infuser. In such an instance, the infuser could constitute integral parts of hosing connecting a plurality of trees in series or parallel.

What is claimed:

1. A device for protecting a tree from damage resulting from freezing temperatures, said device comprising:
    (a) a thermal barrier locatable about the trunk of said tree, said thermal barrier and said tree trunk defining an air space therebetween, said thermal barrier comprising a wall of insulative material configured so as to surround and enclose said tree trunk and said air space, said wall terminating in abutting end surfaces, said insulative material being resilient to permit separation of said abutting ends during placement of said wall about said tree trunk and a heat infusion means;
    (b) plug means for closing said air space at the upper end of said thermal barrier, said plug means comprising a strip of insulative material configured so as to surround and contact said trunk and to contact the inside surface of said thermal barrier, said strip terminating in abutting end surfaces, said insulative material being resilient to permit separation of said abutting ends during installation of said plug; and
    (c) means controllable externally of said thermal barrier for providing said heat infusion in said air space.

2. The protective device claimed in claim 1, wherein said means controllable externally of said thermal barrier for providing heat infusion in said air space comprises a water-circulating tubular member extending adjacent and along said trunk within said air space, said tubular member having an inlet and an outlet end, whereby the heat of water flowing through said tubular member will be conducted to said air space.

3. The protective device claimed in claim 1, wherein said means controllable externally of said thermal barrier for providing heat infusion in said air space comprises a water-circulating tubular member extending adjacent and along said trunk within said air space, said tubular member connected at its outlet end to a sprinkler assembly, whereby the heat of water flowing from said tubular member will be conducted to said air space and the spray projecting from said sprinkler assembly will warm the exposed portions of said tree.

4. The protective device claimed in claim 1 wherein said heat infusion means comprises a water circulating convection chamber configured to extend along said trunk in said air space, said chamber having an inlet and an outlet.

5. The protective device claimed in claim 1, wherein said thermal barrier is formed of mateial chosen from the class consisting of polyurethane, polystyrene, polyethelene, and natural rubber.

6. A device for protecting a tree from damage resutlting from freezing temperatures comprising:
    (a) a thermal barrier locatable about the trunk of said tree, said thermal barrier and said tree trunk defining an air space therebetween, said thermal barrier being of sufficient strength to maitain said air space against the pressure of soil surrounding the exterior of said thermal barrier; and
    (b) plug means for closing said air space at the upper end of said thermal barrier, said plug means comprising a strip of insulative mateiral so configured as to surround and contact said trunk and to contact the inside surface of said thermal barrier, said strip terminating in abutting end surfaces, said insulative material being resilient to permit separation of said abutting ends during installation of said plug.

7. The protective device claimed in claim 6 wherein said thermal barrier comprises a wall of insulative material so configured as to surround and enclose said tree trunk and said air space, said wall terminating in abutting end surfaces, said insulative material being resilient to permit separation of said abutting ends during placement of said wall about said tree trunk.

8. The protective device claimed in claim 6 wherein said thermal barrier is formed of material chosen from the class consisting of polyurethane, polystyrene, polyethelene and natural rubber.

9. The protective device claimed in claim 6 wherein said plug is formed of material chosen from the class consisting of polyurethane, polystyrene, polyethelene and natural rubber.

10. The protective device claimed in claim 6 wherein said thermal barrier and said plug are cylindrical in configuration.

11. The protective device claimed in claim 6 and a sprinkler means attached to an upper surface of said thermal barrier.

12. A method for protecting a tree from damage resulting from freezing temperatures comprising the steps of:
    (a) locating a thermal barrier around the trunk of said tree to define a dead air space between said trunk and said thermal barrier, said thermal barrier comprising an elongated member having a longitudinal bore to accommodate said trunk and a longitudinal cut defining abutting end surfaces;
    (b) inserting a plug means at one end of said longitudinal bore to seal said air space; and
    (c) adjustably heating said air space so as to maintain the trunk of said tree above a critical temperature.

13. A protective method according to claim 12 further including the steps of providing a sprinkler hose passing through said dead air space adjacent said trunk and terminating in a sprinkler head above said barrier, and adjustably irrigating portions of said tree external of said thermal barrier and the exterior of said thermal barrier.

14. A protective method according to claim 12 wherein said step of heating comprises the steps of:
    providing a heat infusion means within said air space;
    connecting said heat infusion means to a remote thermal energy source; and
    activating said thermal energy source.

15. A protective method according to claim 12 wherein said step of heating comprises circulating water through a heat infusion means located within said air space.

* * * * *